United States Patent Office 2,760,965
Patented Aug. 28, 1956

2,760,965
1-METHYL-3-PIPERIDYLMETHYL 2-THENO-ATE, SALTS THEREOF, AND PREPARATION THEREOF

Rolland Frederick Feldkamp, Lincoln, Nebr., assignor to Sterling Drug Inc., New York, N. Y., a corporation of Delaware No Drawing. Application October 2, 1953,
Serial No. 383,925

6 Claims. (Cl. 260—293.4)

This invention relates to new chemical compounds, namely, 1-methyl-3-piperidylmethyl 2-thenoate having the chemical formula

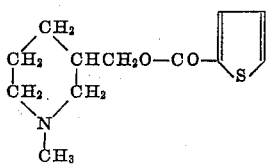

and to salts thereof and a process for their preparation.

1-methyl-3-piperidylmethyl 2-thenoate and its salts possess valuable pharmacological properties, and in particular are useful as antispasmodic and antifibrillatory agents.

1-methyl-3-piperidylmethyl 2-thenoate can be prepared by heating 1-methyl-3-piperidylmethanol with 2-thenoic acid or the acid halide or acid anhydride of 2-thenoic acid. For the reaction of 1-methyl-3-piperidylmethanol with free 2-thenoic acid, the alcohol or the acid is heated together in an inert solvent, preferably in the presence of an acid catalyst, with means for removing the water formed in the reaction. A convenient method for carrying out this procedure involves prolonged heating of 1-methyl-3-piperidylmethanol with 2-thenoic acid in benzene solution in the presence of gaseous hydrogen chloride using a water separator to remove the water from the refluxing vapors and thus to shift the equilibrium in the direction of the desired ester. The volume of water formed also serves as an indicator of the extent of the reaction. The 1-methyl-3-piperidylmethyl 2-thenoate is produced in the form of its hydrochloride salt.

A preferred method comprises heating 1-methyl-3-piperidymethanol with 2-thenoyl chloride, conveniently in an inert organic solvent. The hydrochloride salt of 1-methyl-3-piperidylmethyl 2-thenoate is formed directly. The free base, 1-methyl-3-piperidylmethyl 2-thenoate, can be obtained from the hydrochloride salt by treatment with an alkaline reagent such as an alkali metal hydroxide, carbonate or bicarbonate.

1-methyl-3-piperidylmethyl 2-thenoate is most conveniently used in the form of acid-addition or quaternary ammonium salts. The acids which can be used to prepare acid-addition salts are preferably those which produce when combined with the basic ester, salts whose anions are relatively innocuous to the animal organism in therapeutic doses of the salts, so that the beneficial physiological properties inherent in the basic ester are not vitiated by side-effects ascribable to the anions. Appropriate acid-addition salts are those derived from mineral acids such as hydrochloric acid, hydrobromic acid, hydriodic acid and sulfuric acid; and organic acids such as acetic acid, citric acid and tartaric acid. The quaternary ammonium salts are obtained by the addition to the basic ester of alkyl or aralkyl esters of inorganic acids or organic sulfonic acids, including such compounds as methyl chloride, methyl bromide, methyl iodide, ethyl bromide, propyl chloride, benzyl chloride, benzyl bromide, methyl sulfate, methyl benzenesulfonate and methyl p-toluene-sulfonate.

The following examples will further illustrate the invention.

EXAMPLE 1

1-methyl-3-piperidylmethyl 2-thenoate hydrochloride

A solution of 7.34 g. (0.05 mole) of thenoyl chloride in 40 cc. of benzene was heated to refluxing temperature in a 200 cc. flask fitted with a dropping funnel, condenser and calcium chloride tube. There was then slowly added a solution of 6.46 g. (0.05 mole) of 1-methyl-3-piperidylmethanol in 35 cc. of benzene, and the reaction mixture was refluxed for one hour. Upon cooling the reaction mixture a crystalline solid formed which was collected by filtration, giving 13.3 g. of 1-methyl-3-piperidylmethyl 2-thenoate hydrochloride, M. P. 147–149° C. Recrystallization from an ethanol-ether mixture gave a sample melting at 152–153° C.

Anal.—Calcd. for $C_{12}H_{17}NO_2S \cdot HCl$: Cl, 12.88; S, 11.62. Found: Cl, 12.83; S, 11.63.

1-methyl-3-piperidylmethyl 2-thenoate hydrochloride has been found to possess antifibrillatory activity when administered to rabbits.

EXAMPLE 2

1-methyl-3-piperidylmethyl 2-thenoate methiodide

An aqueous solution of 6.0 g. (0.0218 mole) of 1-methyl-3-piperidylmethyl 2-thenoate hydrochloride, prepared as described above in Example 1, was made alkaline to litmus with 10% sodium carbonate solution, and the liberated free base, 1-methyl-3-piperidylmethyl 2-thenoate, was extracted with ether. The ether extract was dried over anhydrous magnesium sulfate and then threated with 31.0 g. (13.5 cc., 0.218 mole) of methyl iodide. A crystalline product promptly separated and this was collected by filtration and washed with ether, giving 5.0 g. of 1-methyl-3-piperidylmethyl 2-thenoate methiodide, M. P. 190–193° C. Two recrystallizations from ethanol gave a sample with the melting point 192–194° C.

Anal.—Calcd. for $C_{13}H_{20}INO_2S$: I, 33.3; S, 8.4. Found: I, 33.25; S, 8.61.

This application is a continuation-in-part of my co-pending application, Serial No. 246,339, filed September 12, 1951, now United States Patent No. 2,657,211, which in turn is a continuation-in-part of my application, Serial No. 122,366, filed October 19, 1949, and now abandoned.

I claim:

1. A compound selected from the group consisting of 1-methyl-3-piperidylmethyl 2-thenoate having the formula

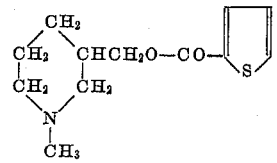

and acid-addition and quaternary ammonium salts thereof, the anions of which do not substantially increase the toxicity of the compound as a whole toward animal organisms.

2. 1-methyl-3-piperidylmethyl 2-thenoate.

3. 1-methyl-3-piperidylmethyl 2-thenoate hydrochloride.

4. 1-methyl-3-piperidylmethyl 2-thenoate methiodide.

5. The process which comprises heating 1-methyl-3-piperidylmethanol with a compound selected from the group consisting of 2-thenoic acid, 2-thenoyl halide and 2-thenoic anhydride.

6. The process for the preparation of 1-methyl-3-piperidylmethyl 2-thenoate hydrochloride which comprises heating 1-methyl-3-piperidylmethanol with 2-thenoyl chloride.

No references cited.